United States Patent [19]

Osterday et al.

[11] Patent Number: 5,226,291
[45] Date of Patent: Jul. 13, 1993

[54] VACUUM BOOSTER DIAPHRAGM/SUPPORT PLATE RETENTION METHOD

[75] Inventors: Craig A. Osterday; Douglas L. Osterfeld, both of Dayton, Ohio

[73] Assignee: General Motors Corporation, Detroit, Mich.

[21] Appl. No.: 808,833

[22] Filed: Dec. 17, 1991

[51] Int. Cl.[5] .................... B60T 13/00; F15B 9/10; F01B 19/00
[52] U.S. Cl. .................... 60/547.1; 91/369.2; 91/376 R; 92/98 R; 92/99
[58] Field of Search ............... 91/369.1, 369.2, 369.3, 91/369.4; 92/98 R, 98 D, 99, 100, 101, 102; 277/37, 181, 183; 60/547.1

[56] References Cited

U.S. PATENT DOCUMENTS

| | | | |
|---|---|---|---|
| 2,989,035 | 6/1961 | Stelzer | 92/99 X |
| 4,043,251 | 8/1977 | Ohmi | 91/369.4 X |
| 4,227,371 | 10/1980 | Takeuchi | |
| 4,256,016 | 3/1981 | Thomas | |
| 4,287,811 | 9/1981 | Katagiri et al. | 91/369.1 |
| 4,334,459 | 6/1982 | Riedel et al. | 92/99 X |
| 4,423,666 | 11/1984 | Ohmi | |
| 4,450,688 | 5/1984 | Boehm | 92/369.2 X |
| 4,787,292 | 11/1988 | Tsuyuki et al. | 91/369.3 |
| 4,936,191 | 6/1990 | Kobayashi | 91/369.2 |
| 5,178,055 | 1/1993 | Shinohara et al. | 92/99 X |

FOREIGN PATENT DOCUMENTS 1040131 8/1966 United Kingdom .

*Primary Examiner*—Edward K. Look
*Assistant Examiner*—John Ryznic
*Attorney, Agent, or Firm*—Ernest E. Helms

[57] ABSTRACT

A brake booster is provided having a power piston slidably mounted in a housing. In a preferred embodiment the piston has a generally radial flange. Encircling the power piston is a flexible diaphragm having along its inner periphery a bead encircling the power piston and a sheet-like section radially extending from the bead. A retaining ring has a first section extending radially outward, a second section generally parallel with the piston and a third section with teeth projecting radially inwardly. Pushing the retainer towards the flange causes the bead to be radially compressed and the third section of the retainer to be deformed. The wedging causes the retainer to be retained in place sealably connecting the diaphragm with the power piston.

8 Claims, 2 Drawing Sheets

VACUUM BOOSTER DIAPHRAGM/SUPPORT PLATE RETENTION METHOD

FIELD OF THE INVENTION

The field of the present invention is that of vehicle brake boosters which utilize a pressure differential of a compressible fluid. More particularly, the present invention is particularly applicable to vehicle brake boosters which utilize the manifold vacuum of the vehicle engine to establish the pressure differential within the booster.

DISCLOSURE STATEMENT

Vacuum brake boosters are well known having been used in automotive vehicles for many years. Essentially they comprise a booster housing having a single power piston which is axially movable by differential pressure. The power piston is connected with a single or plurality of diaphragms. The diaphragm(s) separate the booster housing into a vacuum chamber(s) and a variable pressure chamber(s). The diaphragm(s) is flexible and is usually fabricated from a polymeric substance such as rubber and has an inner portion secured to the power piston.

A valve mechanism for the booster is provided for admitting atmospheric air into the variable pressure chamber(s) (the variable pressure chamber(s) is normally at vacuum pressure when the booster is in the release position) to actuate the booster.

One of the technical challenges in the assembly and function of a vacuum booster is to establish an appropriate means of sealably connecting the diaphragm with the power piston. The method of retention must function for the life of the booster while at the same time try to simplify the manufacturing process. Diaphragms are sealably connected with the power piston in three methods. One method is to place on the inner periphery of the diaphragm an enlarged cross sectional area referred to as a bead, and to then insert the bead into a custom formed interlocking groove of the power piston. The above technique is typically not desirable since it requires extensive manufacturing processes with the power piston. Another technique is to capture the inner periphery of the diaphragm in some type of clamping engagement with the power piston. Clamping requires the use of fasteners and additional manufacturing processes. Still another method of establishing the sealed interface between the diaphragm and power piston is to stretch the diaphragm bead over its associated support plate and to allow that combination to fit within a custom formed groove of the power piston with or without an additional fastener retainer. Here again this technique is usually not considered preferable since it requires intensive manual labor.

SUMMARY OF THE INVENTION

The present invention provides an alternative method of sealably connecting the diaphragm with the power piston to those methods previously described. The present invention provides a method in which the diaphragm is permanently sealably engaged with the power piston by capturing the diaphragm between a flange of the power piston and a retainer which has a section which radially compresses the bead of the diaphragm and another section which by axial thrust to the retainer deforms to a wedging position with the power piston and thereby retains the the bead of the diaphragm with the power piston.

DETAILED DESCRIPTION OF THE DRAWINGS

Figure 1:
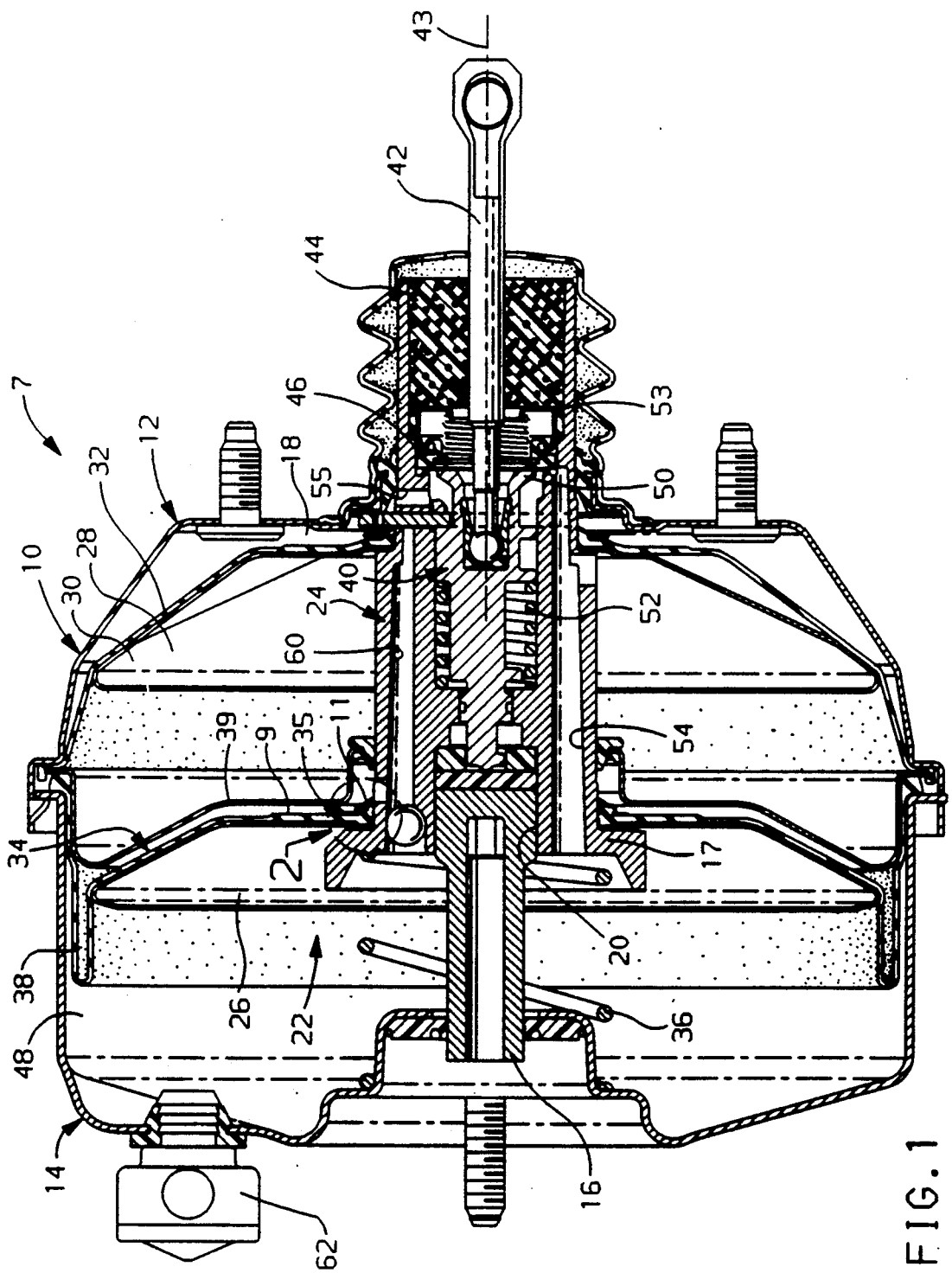
FIG. 1 is a sectional view of a preferred embodiment master cylinder booster according to the present invention.
Figure 2:
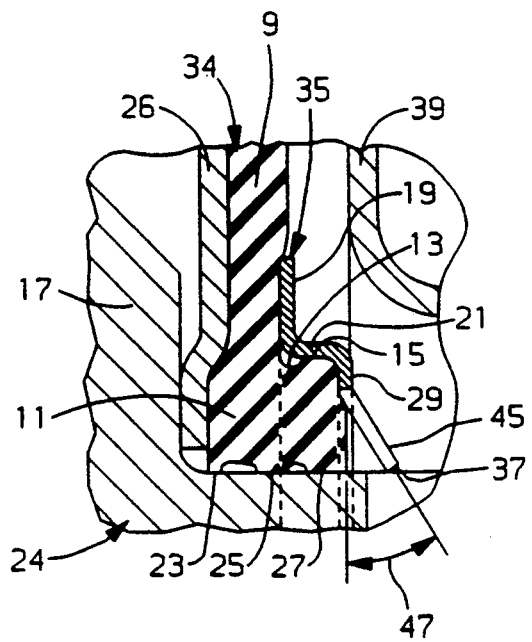
FIG. 2 is an enlarged portion of an encircled portion of FIG. 1.

Referring to FIGS. 1 and 2, a vehicle dual diaphragm tandem vacuum booster assembly 7 includes a booster housing 10 having a rigid front and rear housing section 14/12. The booster 7 has an output rod 16 inserted within a bore 20 of the power piston assembly 22. The piston assembly 22 includes a piston 24, a front or secondary diaphragm support 26 in a rear or primary diaphragm support 30. Sealably connected with the piston 24 are rear primary and front secondary diaphragms 32, 34.

The piston 24 is illustrated in the release position. The piston 24 is normally urged to a release position by a power piston return spring 36. An air control valve assembly 40 is received within the rear portion of the piston 24 and is actuated by suitable well known means such as a push rod 42 which is in turn connected with a brake pedal (not shown). Since the booster 7 is a vacuum suspended booster, the control valve assembly 46 is so positioned that in the release position, the first, second, third and fourth booster assembly power chamber control volumes 18, 28, 38, 48 are at vacuum pressure. The control volumes 28 and 38 are separated by a pressure boundary formed by a rigid divider 39 which is fixed with respect to the front and rear housings 14, 12 but it is slidably associated with the piston 24. Control volumes 18 and 38 are variable pressure chambers joined by passage 60 of the piston 24. Control volumes 28 and 48 are usually held at a vacuum and are connected by passage 54 of the piston 24. A check valve 62 exposes control volumes 28 and 48 to the engine manifold when vacuum is available.

To actuate the booster 7, the push rod 42 pushes against a spring 52 to remove a tip 50 of the air valve assembly 40 from the floating control valve 46 (which is fitted within the piston 24 by a retainer 53). The above allows atmospheric air to pass through a filter 44, pass the tip 50, through the piston radial passage 55 and into control volumes 18 and 38 (via passage 60) and a connecting passage (not shown) between radial passage 55 and passage 60. The entrance of atmospheric air causes a pressure force to act against the supports 30 and 26 causing the piston to move leftward as shown causing the rod 16 to actuate a master cylinder (not shown).

A more detailed explanation of the workings of master cylinder boosters can be gained by review of U.S. Pat. No. 4,881,452, commonly assigned The present invention provides a booster assembly 7 with a novel means of attachment of the diaphragm 34 to the piston 24. The present invention will mainly be described for in relationship to the secondary diaphragm 34. However, with the exception of a few configurational and dimensional changes, the present invention can be utilized in conjunction with both of the diaphragms.

Referring to FIG. 2, the diaphragm 34 has a radially extending sheet section 9 which is joined with a bead 11. The bead 11 has three ridges 23, 25, 27 along its inner surface and along its top end as a ridge 15 in a valley 13. To support the diaphragm, the diaphragm captures a generally rigid support plate 26 between itself and a generally radial flange 17 of the piston 24.

Figure 3:
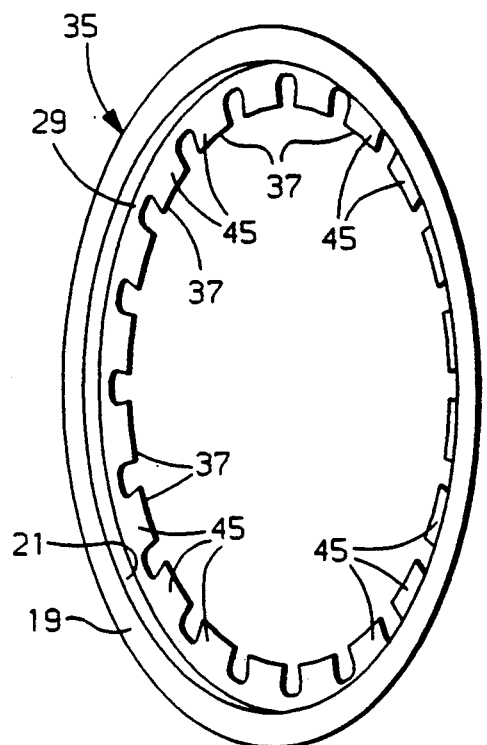
FIG. 3 is a perspective view of the retainer before installation.
Figure 4:
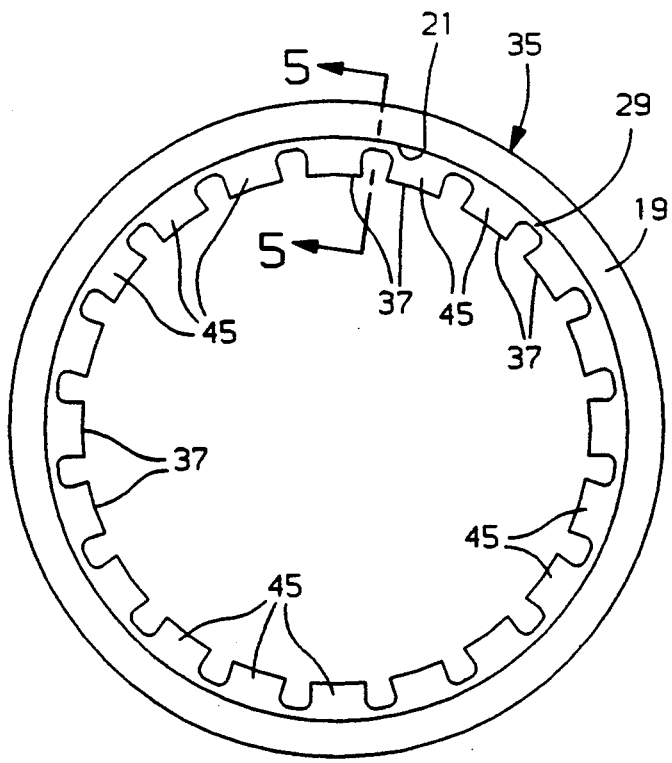
FIG. 4 is a front elevational view of the retainer before installation.

Referring additionally to FIG. 3, to retain the diaphragm in position and to sealably connect with the piston 24, there is provided a retaining clip 35. The retaining clip has a first section 19 joined with a second section 21, and a third section 29 joined to the second section 21. The first section 19 extends generally radially upward and compressively mates with the thin section 9 of the diaphragm. The second section 21 extends generally in a line generally parallel to the axis of travel 43 of the power piston 24. The third section 29 generally extends radially inwardly and has a plurality of teeth 45 with optional burrs (not shown) at tip 37. As shown in FIGS. 2 and 3, the teeth 45 initially before assembly reside in a vertical plane. To the power piston 24 with the diaphragm 34, the retainer 35 is slipped over the power piston 24 and is radially pushed towards the flange 17 of the piston 24. The second section 21 of the retainer radially compresses the bead 11 of the diaphragm typically in the neighborhood of 30% to 40%. The teeth 45 of the third section will be plastically deformed and will usually extend in an angle 47 with approximately 20° to 30° and should not extend more in most instances than 60° from the vertical. The angled teeth 45 will wedge the retainer 35 in position to the extent that after assembly a force of 500 to 800 pounds will be required to remove the retainer 35 from the diaphragm bead 11. Additionally, the radial compression brought on by the second section 21 of the retainer will allow the diaphragm bead piston interface to hold 10 to 15 psi.

Additionally, additional compression (typically 10–15%) will be achieved in an axial direction by contact of the first section 19 with the thin section 9 of the diaphragm 34 which is captured against the support plate 33 which is also retained in position by the retainer.

Figure 5:
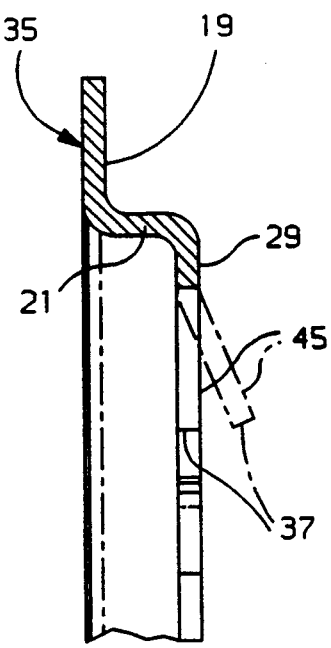
FIG. 5 is a view taken along line 5—5 of FIG. 4.

It has been found preferable in most instances that the teeth have a generally squared off end 37 as best shown in FIG. 5 and have in the neighborhood of approximating 60% contact with the circumference of the piston 24. The bead ridge 15 and valley 13 further aid in achieving the desired effect of radial compression by increasing the radial compression of the bead in the area of the bead 11 which is most adjacent to the third section 29.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle brake booster powered from differential pressure of a compressible fluid for transmitting force to a master cylinder, the booster in combination comprising:

housing means for attachment to the vehicle;
a power piston axially slidably mounted within the housing for transmitting force to the master cylinder, the power piston having a generally radial flange means;
valving means to selectively change the fluid pressure within at least a portion of the housing;
flexible diaphragm means providing a pressure boundary within said housing, the diaphragm means having a bead section surrounding the power piston and having a sheet like section radially extending from the bead section;
a retaining clip sealably connecting the bead section of the diaphragm to the power piston adjacent to the flange means of the power piston, the clip having a first section generally extending radially outward, a second section joined to the first section for radially compressing the bead section of the diaphragm, and a third section joined to the second section extending radially inwardly deforming upon an axial thrust of the retaining ring over the diaphragm bead in a direction towards the power piston flange means, the third section then making wedging contact with the power piston permanently retaining the diaphragm to the power piston.

2. A booster as described in claim 1 further comprising the retainer clip holding a support plate for the diaphragm between the flange of the power piston and the retaining clip.

3. A power booster as described in claim 1 wherein the second section of the retaining clip compresses the bead radially at least 20%.

4. A booster as described in claim 1 wherein the third section of the retaining clip makes an angle with the vertical approximating 20° to 30°.

5. A booster as described in claim 1 wherein said third section has teeth like portions making contact along 60% of the inner periphery of the third section.

6. A booster as described in claim 1 wherein the bead along the edge most adjacent to the third section of the retaining clip has a section which has a greater diameter than a section of the bead most adjacent to the first section of the retainer clip.

7. A vehicle vacuum brake booster for transmitting force to a master cylinder, the booster in combination comprising:

housing means for attachment to the vehicle;
a power piston axially slidably mounted within the housing along its primary axis for transmitting force from the master cylinder, the power piston having a generally radial flange;
valving means to selectively change the fluid pressure within a portion of the housing;
flexible diaphragm means having a bead section surrounding the power piston and a sheet-like section radially extending therefrom;
a support plate encircling the power piston and captured between the power piston radial flange and the diaphragm for supporting the diaphragm;
a retaining clip encircling the power piston and sealably connecting the bead section of the diaphragm to the power piston adjacent the radial flange means, the clip having a first section generally extending radially outward for mating with the sheet section of the diaphragm, a second section joined to the first section extending generally in an orientation parallel to the power piston axis for radially compressing the bead section of the diaphragm, and a third section joined to the second section comprising of a plurality of teeth extending generally radially inward, the third section plastically deforming upon an axial thrust of the retainer over the diaphragm bead in a direction towards the power piston radial flange, the third section then making wedging contact with the power piston by teeth which can comprise approximately 60% of an inner diameter of the retaining clip.

8. A method of assembling a brake booster, the method in combination comprising:

slidably mounting within a housing a power piston with a generally radial flange;

encircling the power piston with a flexible diaphragm having along its inner periphery a bead encircling the power piston and a sheet-like area radially extending from the bead;

axially pushing on to the power piston in a direction towards the flange a retaining ring having a first section extending generally radially outward and a second section joined to and extending from the first section and a third section extending from the second section in a generally radially inward direction;

radially compressing the bead with the retainer second section causing the bead to seal with the power piston and deforming the third retainer section and wedging the same with the power piston to retain the retaining clip and the diaphragm to the power piston.

* * * * *